United States Patent [19]
Fuhr et al.

[11] Patent Number: 5,100,958
[45] Date of Patent: Mar. 31, 1992

[54] USE OF SILICONE RESINS AS FLAMEPROOFING AGENTS

[75] Inventors: Karl Fuhr, Krefeld; Friedemann Müller, Neuss; Karl-Heinz Ott, Leverkusen; Ottfried Schlak, Cologne; Gebhard Wagner, Odenthal-Gloebusch, all of Fed. Rep. of Germany

[73] Assignee: Bayer Aktiengesellschaft, Leverkusen, Fed. Rep. of Germany

[21] Appl. No.: 342,124

[22] Filed: Apr. 24, 1989

[30] Foreign Application Priority Data

May 4, 1988 [DE] Fed. Rep. of Germany ....... 3815124

[51] Int. Cl.$^5$ .................. C08L 51/04; C08L 83/04
[52] U.S. Cl. ........................... 525/66; 525/63; 525/64; 525/67; 525/100; 525/101; 525/105
[58] Field of Search ............... 525/100, 101, 479, 63, 525/64, 66, 67, 105

[56] References Cited

U.S. PATENT DOCUMENTS

| | | | |
|---|---|---|---|
| 3,355,399 | 11/1967 | Cekada | 525/100 |
| 3,686,356 | 8/1972 | Saam | 524/64 |
| 3,898,300 | 8/1975 | Hillard | 525/106 |
| 3,919,157 | 11/1975 | Ide et al. | 524/269 |
| 4,104,322 | 8/1978 | Snavely | 525/105 |
| 4,387,176 | 6/1983 | Frye | 524/268 |
| 4,487,858 | 12/1984 | Lovgren et al. | 523/348 |
| 4,518,727 | 5/1985 | Traver | 524/35 |
| 4,631,307 | 12/1986 | Hosoda et al. | 524/269 |
| 4,748,215 | 5/1988 | Linder et al. | 525/479 |
| 4,803,233 | 2/1989 | Narula et al. | 524/58 |

FOREIGN PATENT DOCUMENTS

| | | | |
|---|---|---|---|
| 272441 | 6/1988 | European Pat. Off. | |
| 3200709 | 9/1982 | Fed. Rep. of Germany . | |
| 3640582 | 6/1988 | Fed. Rep. of Germany | 525/100 |
| 3725576 | 2/1989 | Fed. Rep. of Germany | 525/100 |

*Primary Examiner*—Melvyn I. Marquis
*Assistant Examiner*—R. Dean, Jr.
*Attorney, Agent, or Firm*—Connolly & Hutz

[57] ABSTRACT

The invention relates to powder-form polymer mixtures of silicone resins (B) and thermoplastic polymers (A), to their production and to their use for the modification of thermoplatics.

4 Claims, No Drawings

USE OF SILICONE RESINS AS FLAMEPROOFING AGENTS

Powder-form polymer mixtures of partially crosslinked, particulate silicone rubber and at least one thermoplastic organic polymer are protected in European patent application No. 87 116 839.9. These powder-form polymer mixtures are prepared by mixing dispersions of polymers, including graft polymers, with emulsions or dispersions of partially crosslinked, particulate silicone rubbers and then coagulating and drying the resulting mixtures.

According to the above-cited European patent application No. 87 116 839.9, the powder-form polymer mixtures are used as additives for thermoplastic molding compounds to improve their property spectrum, including in particular their fire behavior.

Further development of this invention has now surprisingly shown that the use of special silicone resins instead of silicone rubbers in accordance with the above-cited European patent application No. 87 116 839.9 produces a further improvement in fire behavior, which is noticeable above all after storage for 7 days at 70° C.

Accordingly, the present invention relates to powder-form polymer mixtures of silicone resins (B) having the following empirical formula $$R_xSi(OR')_yO_{\frac{4-x-y}{2}} \qquad (I)$$

in which R is a monofunctional hydrocarbon radical which may even be substituted, but more especially a methyl and/or phenyl group, R' is an alkyl group or a hydrogen atom, x has a value of 0.75 to 1.75 and y has a value of 0.0001 to 0.5 and in which the silicone resin is made up of units corresponding to the formula $SiO_{4/2}$, $RSiO_{3/2}$, $R_2SiO_{2/2}$ and/or $R_3SiO_{1/2}$ and of thermoplastic polymers (A), the ratio by weight of silicone resin (B) to polymer (A) being between 0.1% by weight to 99.9% by weight and 50% by weight to 50% by weight, preferably between 5% by weight to 95% by weight and 40% by weight to 60% by weight and more preferably between 8% by weight to 92% by weight and 20% by weight to 80% by weight.

The proportion of silicone resin (B) in the powder-form mixture is thus between 0.1% by weight and 50% by weight, preferably between 5% by weight and 40% by weight and more preferably between 8% by weight and 20% by weight, based on the total weight of silicone resin (B) and thermoplastic polymer (A).

Preferred silicone resins (B) corresponding to formula (I) are those in which at least 80% by weight of all the substituents R are methyl or phenyl groups.

The powder-form polymer mixtures are prepared by

I. mixing a dispersion of an organic, thermoplastic polymer (A) having an average particle diameter ($d_{50}$) of from 0.05 to 30 μm and preferably from 0.05 to 5 μm and a solids content of 20% by weight to 60% by weight, based on the weight of the dispersion of component (A), with an emulsion of a silicone resin (B) corresponding to formula (I) and having an average particle diameter ($d_{50}$) of from 0.05 μm to 3 μm and preferably from 0.1 μm to 1 μm and a solids content of up to 60% by weight, preferably from 30% by weight to 50% by weight, based on the weight of the emulsion of component (B), so thoroughly and in such a quantitative ratio that the particles undergo hardly any agglomeration and mixtures of 0.1% by weight to 50% by weight, preferably 5% by weight to 40% by weight and more preferably 8% by weight to 20% by weight silicone resin (B) with 99.9% by weight to 50% by weight, preferaby 95% by weight to 60% by weight and more preferably 92% by weight to 80% by weight thermoplastic polymer (A), based on the total weight of silicone resin (B) and thermoplastic polymer (A) are present, II. the mixture thus obtained is coagulated in known manner at 20° C. to 120° C. and at pH values of 7 to 2 and preferably at pH values of 5 to 3 with formation of a finely divided mixture of components (A) and (B) and III. after isolation, the coagulate is dried in known manner at temperatures of 50° C. to 150° C. and more especially at temperatures of 80° C. to 120° C.

Accordingly, the present invention also relates to a process for the production of the powder-form polymer mixtures according to the invention which is characterized in that the mixtures are prepared by steps I, II and III as described above.

In one preferred embodiment of the process according to the invention, aqueous dispersions of component (A) are used.

It is particularly preferred to use a mixture of dispersions of component (A) which contains from 20% to 80% by weight of finely divided polymer (average particle diameter $d_{50}$=0.05 to 0.15 μm) and 80 to 20% by weight of coarsely divided polymer (average particle diameter $d_{50}$=0.20 to 0.8 μm and more especially 0.25 to 0.5 μm).

The dispersions of component (A) contain polymer particles in uncrosslinked, partially crosslinked or highly crosslinked form. The dispersion medium used may be water or an organic solvent, such as an ester, a hydrocarbon, a halogenated hydrocarbon, an alcohol or mixtures thereof. The preferred medium is water. Dispersions such as these are known, for example from EP-A 28 344 and DE-AS 20 47 427. They are standard polymer dispersions of the type which can be obtained by emulsion polymerization or by dispersion of a polymer.

The dispersions of component (A) suitable for use in accordance with the invention preferably contain thermoplastic homopolymers or copolymers of olefinically unsaturated monomers, such as styrene, α-methyl styrene, p-methyl styrene, halogen styrene, acrylonitrile, methacrylonitrile, alkyl acrylate, alkyl methacrylate, maleic anhydride, N-substituted maleic imide, vinyl acetate, vinyl chloride, vinylidene chloride, vinylidene fluoride, and/or thermoplastic graft polymers of these monomers on rubbers having glass transition temperatures below 0° C., preferably below −10° C., the graft polymers containing from 8 to 80% by weight rubber.

Particularly suitable polymers for dispersions of component (A) are homopolymers of styrene, methyl methacrylate and vinyl chloride, copolymers thereof with at least one of the monomers acrylonitrile, methacrylonitrile, N-substituted maleic imide (more especially N-phenyl maleic imide or N-cyclohexyl maleic imide), alkyl methacrylate or alkyl acrylate, and also graft polymers, for example of polybutadiene, polychloroprene or styrene/butadiene or acrylonitrile/butadiene copolymer rubbers having gel contents (as measured at 20° C.) of greater than 30% by weight, of alkyl acrylate rubbers, EPDM rubbers (ethylene/propylene/diene/monomer rubbers) or of silicone rubbers grafted with styrene, α-methyl styrene, acrylonitrile, methyl methacrylate, vinyl chloride, vinyl acetate or mixtures thereof.

The emulsions of the silicone resins (B) suitable for use in accordance with the invention preferably contain water as the dispersion medium.

The production of the silicone resins corresponding to formula (I) is known. For their subsequent processing to emulsions, these silicone resins may be used as such or in the form of solutions in suitable organic solvents. Silicone resin solutions should best contain no more than 60% solvent, because the solvent has to be subsequently evaporated off again.

The production of silicone resin emulsions is also known and is described, for example, in DE-OS 3 200 709. The silicone resin emulsions are particulate and, as already mentioned, have average particle diameters ($d_{50}$ values) of from 0.05 to 3 μm and more especially from 0.1 to 1 μm.

The thorough mixing of the dispersion of component (A) with the emulsion of component (B) with no agglomeration is carried out, for example, by intensively stirring both the dispersion of component (A) and the emulsion of component (B) together in the desired quantitative ratio according to the invention, optionally followed by thorough mixing in an emulsifying machine. After thorough dispersion, 1.8% by weight, based on the polymer solids, of phenolic antioxidants are added in the form of an aqueous dispersion and incorporated in the mixture.

The coagulation of the mixture of the dispersion of component (A) and the emulsion of component (B) is carried out, for example, by introducing the mixture of the dispersion of component (A) and the emulsion of component (B) in a thin stream with stirring into a 1% aqueous solution of magnesium sulfate and acetic acid in each case. The temperature of the precipitation solution is in the range from 80° to 90° C.

The coagulated mixture is isolated, for example, by filtration or centrifugation and repeated washing with distilled water until the washing water is free from electrolyte.

The coagulated mixture is dried to constant weight, for example at 100° C. in a vacuum drying cabinet until a white powder is obtained.

The powder-form polymer mixtures according to the invention are suitable as flameproofing agents for thermoplastics. To this end, they are used in such quantities that the content of silicone resin (B) in the flame-resistant thermoplastic molding compound is at most 5% by weight, preferably from 4% by weight to 0.25% by weight and more preferably from 2.5% by weight to 0.5% by weight, based on the total weight of flame-resistant thermoplastic molding compound.

Accordingly, the present invention also relates to the use of the powder-form polymer mixtures according to the invention as flameproofing agents for thermoplastics in quantities of at most 5% by weight, preferably in quantities of from 4% by weight to 0.25% by weight and more preferably in quantities of from 2.5% by weight to 0.5% by weight, based on the total weight of flame-resistant thermoplastic molding compound, of silicone resin (B).

Suitable thermoplastics which may be flameproofed with the powder-form polymer mixtures according to the invention are, on the one hand, the above-mentioned thermoplastic polymers suitable for the production of the powder-form polymer mixtures according to the invention, more especially ABS, polystyrene, high-impact polystyrene and PVC.

On the other hand, thermoplastic polycarbonates, thermoplastic polyamides, thermoplastic aliphatic polyesters, such as for example polyalkylene terephthalates, thermoplastic aromatic polyesters, such as bisphenol-A-terephthalates, aromatic thermoplastic polyarylene sulfones, thermoplastic polyphenylene ethers and thermoplastic polyphenylene sulfides, are suitable thermoplastics for flameproofing.

The thermoplastics may be flameproofed with the powder-form polymer mixtures according to the invention either individually or in the form of mixtures of different thermoplastics, i.e. in the form of alloys.

Particularly suitable thermoplastics suitable for flameproofing in accordance with the present invention are ABS, thermoplastic bisphenol-A-polycarbonate thermoplastic polycaproic amide, polyhexamethylenediaminoadipic acid amide, polyethylene terephthalate and polybutylene terephthalate and also mixtures of these particularly suitable thermoplastics.

The powder-form polymer mixtures according to the invention are incorporated in the thermoplastics by melt compounding of the thermoplastics in the form of granulates or powders with the powder-form polymer mixtures according to the invention at a temperature in the range from 200° C. to 300° C. in standard mixers, such as kneaders, extruders, rolls and screws.

Accordingly, the present invention also relates to a process for the incorporation of the powder-form polymer mixtures according to the invention in thermoplastics which is characterized in that the thermoplastics are melt-compounded with the powder-form polymer mixtures according to the invention in standard mixers at temperatures in the range from 200° C. to 300° C.

The present invention also relates to mixtures of thermoplastics with the powder-form polymer mixtures according to the invention.

The use of the powder-form polymer mixtures according to the invention as additives for thermoplastics improves not only the flame resistance of the thermoplastics, but also various other properties of the thermoplastics, including their impact strength, their heat resistance and their mold release behavior.

On the other hand, the addition of the powder-form polymer mixtures according to the invention to the thermoplastics does not adversely affect the surface properties of the thermoplastics; the affinity of moldings of the thermoplastics for lacquering is not affected by the incorporated powder-form polymer mixtures according to the invention.

Although it was already known that polysiloxanes could be used to reduce the tendency towards dripping of flame-resistant polycarbonates (DE-OS 25 35 261) and flame-resistant polycarbonate alloys (DE-OS 29 18 882 and EP-OS 00 19 127), the subject of the present invention, namely the powder-form polymer mixtures and their use as flameproofing agents, could not be derived therefrom.

Standard additives for the particular thermoplastics, such as stabilizers, pigments, flow aids, antistatic agents, mold release agents and/or other flameproofing agents, may additionally be incorporated in the thermoplastics before, during or after the incorporation in accordance with the invention of the powder-form polymer mixtures according to the invention.

Other flameproofing agents than the powder-form polymer mixtures suitable for use in accordance with the invention are those of the type normally used for the particular thermoplastics, i.e. for example metal salts, halogen compounds or phosphorus compounds. Other flameproofing agents such as these may not only be added to the thermoplastics as additives, they may also be included—as in the case of halogen for example—in the synthesis of the particular thermoplastics through the use of suitable halogen-containing reactants.

Although the addition of the powder-form polymer mixtures according to the invention improves the mold-release behavior of the thermoplastics, mold release may be further enhanced by the addition of typical mold release agents for the particular thermoplastics.

Mold release agents such as these are, for example, fatty acid esters of long-chain monoalcohols, such as stearyl alcohol trihydric alcohols, such as glycerol or trimethylol propane tetrahydric alcohols, such as pentaerythritol, or hexahydric alcohols, such as sorbitol for example.

Accordingly, the present invention also relates to a process for the additional incorporation of stabilizers, pigments, flow aids, antistatic agents, mold release agents and/or other flameproofing agents in the thermoplastics which is characterized in that stabilizers, pigments, flow aids, antistatic agents, mold release agents and/or other flameproofing agents are added to and mixed with the thermoplastics before, during or after the incorporation of the powder-form polymer mixtures according to the invention.

The present invention also relates to mixtures of thermoplastics with the powder-form polymer mixtures according to the invention and, in addition, with stabilizers, pigments, flow aids, antistatic agents, mold release agents and/or other flameproofing agents.

The thermoplastics in which the powder-form polymer mixtures according to the invention and, optionally, the stabilizers, pigments, flow aids, antistatic agents, mold release agents and/or other flameproofing agents mentioned above are incorporated, may be processed to moldings by any of the methods normally used for processing thermoplastics, such as granulation, injection molding, extrusion, calendering, pressing and blow molding.

The moldings in question may be used, for example, as plastics components in the automotive industry, in the building industry and in the electrical industry and also for domestic appliances.

EXAMPLES

A) Preparation of a polymer dispersion of component (A)

Dispersion of an ABS graft polymer of 50% by weight of a styrene/acrylonitrile mixture (ratio 72:28) on 50% by weight particulate polybutadiene having an average particle diameter ($d_{50}$) of 0.4 μm obtained by emulsion polymerization. The dispersion has a solids content of 30% by weight.

B) Preparation of a silicone resin emulsion of component (B) corresponding to empirical formula (I), in which x is 1.25.

A silicone resin emulsion, in which the silicone resin consists of 70 mol-% $MeSiO_{3/2}$, 15 mol-% $Me_2SiO_{2/2}$, 10 mol-% $PhSiO_{3/2}$ and 5 mol-% $Me_3SiO_{1/2}$ units, contains 1% hydroxyl groups and is diluted with equal parts toluene, is prepared.

To this end, 38.8 kg deionized water is introduced into a stirred vessel and heated to 60° C. 1.2 kg of an emulsifier mixture having an HLB value of approximately 15 (oleyl alcohol containing 2 ethylene oxide units and polyoxyethylene triglyceride) are then added with stirring. After stirring for 10 minutes, 60 kg of the above resin solution are added over a period of 2 hours, followed by stirring for 30 minutes. The emulsion is then homogenized 3 times in a high-pressure emulsifying machine. The emulsion obtained has an average particle size of 0.8 μm, remains stable in storage for longer than 3 months and has a solids content of 30.5% by weight.

C) Preparation of an emulsion of the silicone rubber according to European patent application No. 87 116 839.9 (LE A 24 884-EP) = Example 1 of this European patent application which is being included here for comparison purposes.

38.4 Parts by weight octamethyl cyclotetrasiloxane, 1.2 parts by weight tetramethyl tetravinyl cyclotetrasiloxane and 1 part by weight γ-mercaptopropyl methyl dimethoxysilane are stirred with one another. 0.5 Part by weight dodecyl benzenesulfonic acid in 58.4 parts by weight water is then added over a period of 1 hour with intensive stirring. The pre-emulsion is homogenized twice at 200 bar in a high-pressure emulsifying machine. Another 0.5 part dodecyl benzenesulfonic acid is added.

The emulsion is stirred for 2 h at 85° C. and then for 36 h at room temperature and subsequently neutralized with 5N NaOH. A stable emulsion having a solids content of approximately 36% is obtained. The polymer has a gel content of 82% by weight, as measured in toluene, and an average particle size ($d_{50}$) of 0.3 μm.

The silicone rubber of this emulsion has an x value of 2 in empirical formula (I).

EXAMPLE 1

Preparation of a powder-form polymer mixture according to the invention of the silicone resin emulsion of Example B) and the thermoplastic polymer dispersion of Example A).

The polymer dispersion of Example A) is mixed with the silicone resin emulsion of Example B) in such a way that the mixture contains 90% by weight (A) and 10% by weight (B), based on solids. The mixture is stabilized with 1.8% by weight, based on polymer solids, of phenolic antioxidants and thoroughly stirred. The mixture is coagulated with an aqueous solution of $MgSO_4$ (Epsom salt) and acetic acid at 85° to 95° C. and at pH values of 4, filtered and washed until free from electrolyte, followed by drying at 100° C. to form a powder.

This powder may be compounded with other thermoplastics.

COMPARISON EXAMPLE (corresponds to Example 2 of European patent application No. 87 116 839.9 (Le A 24 884-EP)).

The powder-form polymer mixture is prepared as described in Example 1 above, except that the silicone rubber emulsion of Example C) is used instead of the silicone resin emulsion of Example B) and the silicone content amounts to 10% by weight.

The powder obtained may be compounded with other thermoplastics.

EXAMPLE 2 and COMPARISON TESTS 1 and 2

Components, production and testing of the molding compounds.

Materials used:

I. Aromatic polycarbonate of 10% by weight tetrabromobisphenol A and 90% by weight bisphenol A having a relative viscosity, as measured in $CH_2Cl_2$ at 25° C. of 1.284 (0.5% by weight solution).

II. Thermoplastic polymer of styrene and acrylonitrile having an acrylonitrile content of 23% by weight and an average molecular weight of 60,000.

III. ABS graft polymer of 50% by weight of a styrene/acrylonitrile mixture (ratio by weight 72:28) on 50% by weight particulate polybutadiene having an average particle diameter ($d_{50}$) of 0.4 μm obtained by emulsion polymerization.

IV. Silicone-resin-containing polymer of Example 1.

IVa. Silicone-rubber-containing polymer of the Comparison Example.

V. Triphenyl phosphate (TPP).

VI. Pentaerythritol tetrastearate (PETS).

Production and testing of the molding compounds:

The molding compounds were produced by direct compounding of the components listed in Table 1 in a Banbury internal kneader (Pomini-Farell) of the Br type (1.2 l) or the OOC type (3 l) at a temperature of 230° to 240° C., followed by granulation.

TABLE 1

| Component | I | II | III | IV | IVa | V | VI |
|---|---|---|---|---|---|---|---|
| Quantities in % by weight | | | | | | | |
| Comparison Test 1 | 58.0 | 17.5 | 13.7 | — | — | 9.9 | 0.9 |
| Example 2 | 58.0 | 17.5 | 3.7 | 10 | — | 9.9 | 0.9 |
| Comparison test 2 (= Example 4 of European patent application no. 87 116 839.9) | 58.0 | 17.5 | 3.7 | — | 10 | 9.9 | 0.9 |

The molding compounds obtained are injection-molded at 260° C. (unit: Werner und Pfleiderer DKS 275 screw, locking force 275 MP, screw diameter 56 mm, length L/D-23/1) and subjected to the following tests:

impact strength according to DIN 53 543 ($a_n$)

notched impact strength according to DIN 53 453 ($a_k$)

fire test UL 94 of Underwriters' Laboratories, page 94.

The results obtained are shown in Table 2.

TABLE 2

| | | | UL 94/1.6 mm-bar storage of test specimens | |
|---|---|---|---|---|
| | $a_n$ (kJ/m$^2$) | $a_k$ (kJ/m$^2$) | standard climate | 70° C./ 7 days |
| Comparison test 1 | u.b. | 14 | V-2 | V-2 |
| Example 2 | u.b. | 14 | V-0 | V-0 |
| Comparison test 2 | u.b. | 13 | V-0 | V-1 |

*u.b. = Test specimens unbroken

We claim:

1. A process for the incorporation of a polymer mixture into a thermoplastic selected from the group consisting of ABS, thermoplastic bisphenol-A-polycarbonate, thermoplastic polycaproic amide, polyhexamethylenediaminoadipic acid amide, polyethylene terephthalate, polybutylene terephthalate and mixtures thereof by melt-compounding the thermoplastic with the polymer mixture in standard mixers at temperatures in the range from 200° C. to 300° C., said polymer mixture being obtained by i) mixing a dispersion of an organic thermoplastic polymer with an emulsion of a resin (B) wherein polymer (A) comprises homopolymers or copolymers of olefinically unsaturated monomers or thermoplastic graft polymers of said monomers on rubbers having glass transition temperatures below 0° C., said polymers (A) having an average particle diameter ($d_{50}$) of 0.05 to 30 μm and a solids content of 20% by weight to 60% by weight, based on the weight of the dispersion of component (A), said emulsion is of a silicone resin (B) corresponding to formula

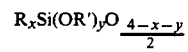

$$R_xSi(OR')_yO_{\frac{4-x-y}{2}}$$

in which R is a monovalent hydrocarbon radical, R' is an alkyl or a hydrogen atom, x has a value of 0.075 to 1.75 and y has a value of 0.0001 to 0.5 and in which the silicone resin is made up of units corresponding to the formula $SiO_{4/2}$, $RSiO_{3/2}$, $R_2SiO_{2/2}$ and/or $R_3SiO_{1/2}$ having an average particle diameter ($d_{50}$) of from 0.05 to 3 μm and a solids content of up to 60% by weight, based on the weight of the emulsion of component (B), said mixing being so thoroughly and in a such a quantitative ratio that the particles undergo substantially no agglomeration and whereby mixtures of 0.1% by weight to 50% by weight silicone resin (B) with 99.9% by weight to 50% by weight thermoplastic polymer (A), based on the total weight of the silicon resin (B) and thermoplastic polymer (A), are obtained, ii) coagulating the mixture thus obtained from step i) at 20° C. to 150° C. and at pH values of 7 to 2 with formation of a finely divided mixture of components (A) and (B), iii) isolating and drying the coagulate from step ii) at temperatures of from 50° C. to 150° C.

2. A process as claimed in claim 1 wherein at least one additive comprising stabilizers, pigments, flow aids, antistatic agents, mold release agents or flameproofing agents are additionally mixed with the thermoplastics before, during or after incorporation of the polymer mixtures.

3. Mixtures of thermoplastics and the polymer mixtures obtained by the process according to claim 1.

4. Mixtures as claimed in claim 3 additionally containing stabilizers, pigments, flow aids, antistatic agents, mold release agents or flameproofing agents.

* * * * *